Feb. 7, 1933. A. R. EARL 1,896,136
METHOD AND APPARATUS FOR UTILIZING THE POTENTIAL
ENERGY OF CIRCULATING CONDENSING WATER
Filed Aug. 12, 1929
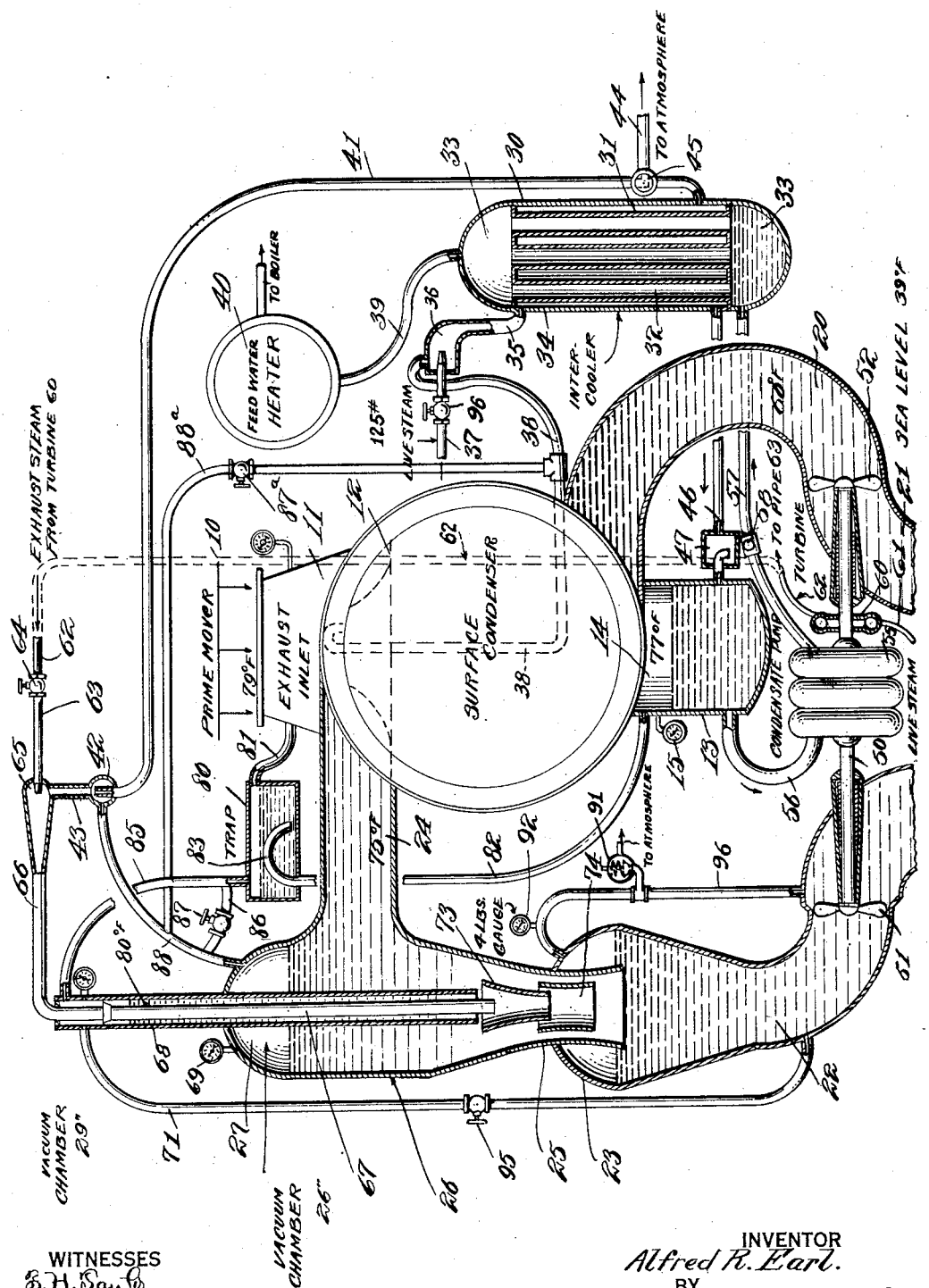
WITNESSES
INVENTOR
Alfred R. Earl.
BY
ATTORNEY Patented Feb. 7, 1933

1,896,136

UNITED STATES PATENT OFFICE

ALFRED R. EARL, OF TOLEDO, OHIO

METHOD AND APPARATUS FOR UTILIZING THE POTENTIAL ENERGY OF CIRCULATING CONDENSING WATER

Application filed August 12, 1929. Serial No. 385,432.

This invention relates to a method for utilizing the potential energy of circulating condensing water and an apparatus for carrying out the method.

It is well known that turbo-electric generating stations, operated with steam, are always located near a body of water, affording large quantities of cooling water, for condensation of the steam that has been used. Steam plants of considerable rating use large quantities of water of great weight that has been elevated above the surface of its local natural level to an altitude sufficient to flood the condensing element, and the water has a capacity for doing work proportionate to its weight and its altitude as a waterfall.

It is the object of the present invention to utilize the potential capability of the circulated cooling water of surface condensers to do work for aiding in the mechanical operation of the condensers.

A further object of the invention is the provision of a method for utilizing the potential energy of circulating condensing water which has been elevated to an altitude above the surface of its local natural level and this elevated water due to its height and weight, is capable of producing work, the potential energy of the elevated water being utilized for aiding in elevating the water to a surface condenser.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawing:

The figure shows more or less diagrammatically an apparatus for carrying out my method.

Referring more particularly to the drawing, 10 designates a prime mover such as a steam turbine or steam engine having an exhaust 11 in communication with a surface condenser 12 to which the exhaust steam from the prime mover is conducted for the purpose of cooling and condensing the vapors. A well 13 is connected to the surface condenser and is adapted to receive the condensate from the condenser below the space 14 in the well. The temperature of the condensate in this well is approximately 77° Fahrenheit. A gage 15 is connected with the space 14, and indicates the vapor pressure in the well.

A conduit 20 is connected with a source of supply at its lower end 21 while the upper end is in communication with the surface condenser 12. A second conduit 22 is also in communication with the source of water and has a dome-shaped portion 23 at its upper end forming an air space. A discharge conduit 24 has one end in communication with the surface condenser 12 and is adapted to carry off the water which is discharged in the conduit 24 through a Venturi effect 25 of which a restricted portion of the conduit projects into the discharge conduit 22 below the air dome 23. The purpose of the air dome will be presently explained. The level of the liquid in the conduit 24 and also in the vertically disposed stand pipe 26 is maintained at a predetermined level, thereby providing a vacuum chamber 27 at the upper end of the stand pipe 26. During the operation of the device the vacuum chamber is maintained at a pressure of approximately 26" of mercury.

A cooler, generally designated by the numeral 30, consists of a hollow shell 31 having vertically disposed passages 32 in open communication with the upper and lower ends 33 of the shell 31. A compartment 34 embracing the conduit 32 is supplied with steam by means of a conduit 35 from an ejector 36, which in turn is in communication with a pipe 37 connected with a source of live steam under a pressure of 125 pounds. A pipe 38 connects the vapor chamber of the surface condenser 12 with the steam jet-air-pump 36.

A pipe 39 connects the upper end 33 of the shell 31 with a heater 40 of any suitable type.

This heater is in turn connected with the boiler feed pumps in a manner which is not shown. A pipe 41 connects the steam jacket 34 with an ejector 42 which is in communication with a pipe 43. A pipe 44 is connected with the pipe 41 at a point where a two-way valve 45 is provided whereby the steam may be directed to the pipe 41 or through the pipe 44 to the atmosphere. A return pipe 46 connects the compartment 34 of the cooler 30 by means of a trap 47 with the well 13. The trap acts as a seal and permits condensate to flow from the intercooler only.

A shaft 50 extends in opposite directions and has its ends located within the entrance conduit 20 and discharge conduit 22. A propeller 51 is secured to that portion of the shaft 50 which extends into the discharge conduit 22 and is of such a pitch that the discharge of water from the conduit 22 will operate the shaft 50 at high velocity. The propeller blades must be so constructed that they will be operated upon by the outflow of the water from the conduit 22. A propeller 52 is mounted on that end of the shaft 50 which is located within the inlet conduit 20 and is pitched so that it will accelerate the flow of water through passage 20.

A condensate pump 55 is secured to the shaft 50 and is placed in communication with the well 13 by means of a pipe 56. A discharge pipe 57 having a check valve 58 is connected between the pump 55 and the lower compartment 33 of the cooler 30.

A steam turbine 60 is connected also with the shaft 50 and has an inlet pipe 61 connected with live steam under pressure and a discharge pipe 62 which is connected with a pipe 63 having a valve 64 interpolated in the connection between the pipes 62 and 63. A jet-air-pump 65 is located at a point in the pipes 63 and 66 where they are joined and where the pipe 43 joins the connection between the last-mentioned pipes.

The pipe 66 has an extension 67 disposed within a tube 68 having a portion extending downwardly into the stand pipe 26 and terminating at its lower end adjacent the Venturi effect 25.

A gage 69 is connected with the chamber 27 of the stand pipe 26. The gage 69 indicates the pressure in chamber 27. The water in the tubular member is adapted to normally have a temperature of 80° Fahrenheit. A pipe 71 connects the upper end of the tubular member 68 with the lower portion of the discharge conduit 22, and is employed for causing recirculation of a small amount of water from the pipe 22 to the space in pipe 68. The purpose of this arrangement is to cause a film flow of water down the external surface of pipe 67 and effect a more efficient heat transfer from the steam to the water.

Below the tubular member 68 and spaced therefrom is a venturi 73 in communication with the second venturi 74, and these Venturi tubes are disposed within the Venturi effect 25 of the stand pipe 26. The upper end of the venturi 73 is spaced below the lower end of the conduit 68 while the pipe 67 projects through the lower end of the tubular member 68 and is disposed within the Venturi effect 73. A trap 80 is connected at 81 with the exhaust inlet 11. A pipe 82 has a goose neck 83 located within the trap. The upper end of the pipe 82 is curved upwardly and then downwardly while it passes through the bottom of the trap and is connected to the upper end of the well 13.

A pipe 85 connects the upper end of the tubular member 68 with the upper end of the trap and a branch connection 86 having a valve 87 connects the pipe 85 with a pipe 88. The last mentioned pipe connects the vacuum chamber 27 of the stand pipe 26 with the jet-air-pump 42.

A pipe 90 connects the air chamber 23 of the standpipe 22 with a lower portion of the standpipe. A back pressure valve 91 is placed in the pipe 90 and a pressure gage 92 is also included in the pipe 90 and is adapted to maintain a pressure of approximately four pounds in the air chamber 23.

A valve 95 is interpolated in the pipe 71. A valve 96 controls admission of live steam through the pipe 37 and through the jet-air-pump 36.

The operation of my device is as follows: Live steam at approximately one hundred and twenty five pounds gage pressure is admitted to the pipe 37 which is discharged through the jet-air-pump 36, thereby creating a vacuum in the pipe 38 and the surface condenser 12. Steam and air from the jet-air-pump 36 is conducted by pipe 35 to the cooler 30 and thence either by pipe 41 to the air pump 42 or by pipe 44 to the atmosphere. At this time the valve 45 is so positioned that air will be cut off from the pipe 41. It is assumed that a vacuum of 26″ of mercury has been created within the condenser and within the circulating water space of the condenser by means of the pipe 86. The valve 87 at this time has been opened to permit communication between the pipes 85 and 88.

Water will rise not only in the intake pipe 20 but in the discharge pipe 22 to an altitude of 24′ and 9″ within the water circulating space of the apparatus. The by-pass valve 87 is closed and live steam at high boiler pressure and superheated is admitted by means of pipe 61 to the turbine 60 and this steam is exhausted through pipe 62, past valve 64 and into the jet-air-pump 65. This causes rotation of the shaft 50 and likewise the condensate pump 55.

The propellers 51 and 52 are now being revolved by the turbine 60 and propeller 51 draws the water down from the top of pipe 22 and discharges it at the bottom of the same back into the river or other body of water, while at the same time propeller 52 is drawing water up from the body of water through conduit 20 and discharging the water into the usual tubular element within condenser 12 and then ultimately into pipe 24.

The steam exhausts from the turbine 60 at pressures arranging through 100 to 125 pounds per square inch. Since the jet-air-pump 65 is in operation air and vapor through pipes 41 and 88 are drawn through the same and are discharged jointly with the exhaust steam through the pipe 66 and thence down the heater pipe or tubular member 67 to the submerged exhaust injector 25 where the steam is condensed and its discharge constitutes a hydraulic jet through the venturi 73 which is compounding with the second venturi 74 providing an additional hydraulic jet effect so that the liquid is discharged at high velocity into the discharge tube 22 and at super-atmospheric pressure, thereby reversing the flow of the water in the conduit 22 which had risen in the initial stages of the operation of the jet-air-pump 36 which had created a vacuum in the surface condenser and elevated the water in the surface condensate to approximately 24′ 9″.

The two-way valve 45 is now closed to the atmosphere and the steam and air from the cooler 30 is discharged through pipe 41, and jet-air-pump 42 for creating additional suction in the pipe 88 and in the chamber 27. The vacuum is then raised to approximately 29″ within the vapor space of the surface condenser 12 and the water in the annular space between the tubular member 68 and the heater tube 67 will rise to an altitude of approximately 31′ 6″.

The water being discharged through the venturi 73, 74 and 25 at high velocity, thereby overcomes the super-atmospheric pressure in the chamber 23 and discharge tube 22 so that the water in the conduit 22 will have a hydrostatic head. The entrained air which escapes from the water of condensation, the cooling water of the circulatory system, and air leakage in general is conducted by pipe 90 past valve 91 into the lower end of the discharge conduit 22. Some of the air is retained in the chamber 23 at a constant pressure of approximately 4 pounds more or less by the back pressure valve 91. The 4 lbs. air pressure in the chamber 23 on the surface of the water in the discharge conduit 22 approximates a 9′ hydrostatic head plus the natural hydrostatic head previously mentioned, making a total potential head above the water-source level and is capable of doing work proportionate to the weight and velocity of the water flowing through the discharge conduit 22, since it tends to seek the level of its source.

The exhaust steam from turbine 60 discharging into the steam-air-jet pump 65 draws the natural air content of the water in the conduit 24 through pipe 88, and also the air content from conduit 41 which has been drawn from the exhaust vapor space of condenser 12 through pipe 38 by jet pump 36 that discharges through conduit 35 jointly with the steam pipe 37. The mixed steam and air so discharged into the vapor compartment 34 of the inter-cooler 30 are separated by the condensation of the steam. The water or condensate of the steam from the cooler flows to the hot well 13 while air is drawn into pipe 41 by the suction created by the member 65. This constitutes a "two-stage" effect of the air pumps 36 and 65 and the vacuum in pipe 38 will be higher than in pipe 88.

The cooling circulating water is assumed to be at 60° F. in the inlet pipe 20 and 75° F. in the outlet pipe 24, with a hot well temperature of 77° F. for a 29 inch vacuum. The water will rise in the annular space between pipe 68 and pre-cooler pipe 67 to an altitude of 31 feet and 6 inches, at a temperature of 75° F., and contain 43 B. t. u. per lb. as heat of the liquid. The boiling point of the water in the space with a vacuum of 29 inches will be 80° F., with 48 B. t. u. as heat of liquid, and 1095 B. t. u. as latent heat of vaporization. Therefore, 5 B. t. u. per lb. will be required to raise the water in the space to its boiling point, plus 1095 B. t. u. to vaporize it, or 1100 B. t. u. total from water at 75° F. to vapor at 80° F.

If the exhaust steam in pipe 62 be assumed at 100 lbs. pressure gage, then its temperature will be 338° F., heat of liquid 308 B. t. u., and latent heat 882 B. t. u. per lb., for a total of 1190 B. t. u. total heat content of vapor. Therefore, if the steam in pipe 67 is expanded down to 80° F. in the 75° F. water, the temperature drop will be 258° F., and the 308 B. t. u. heat of liquid at 100 lbs. pressure gauge, minus the 48 B. t. u. heat of liquid at 0.998 lb. absolute pressure, will be 260 B. t. u. sensible heat of liquid that will be transformed into latent heat of vaporization.

As the total heat of steam at 100 lbs. gauge, or 114 lbs. absolute pressure, is 1190 B. t. u. per lb., and the total heat of vapor at 0.998 lb. absolute, (the equivalent of 29 inches of vacuum) is 1095 B. t. u. per lb., there will be a difference of 95 B. t. u., plus the transformed 260 B. t. u., equals 355 B. t. u. per lb. of steam flowing in the pre-cooler pipes 67 to be absorbed by the water surrounding same at a temperature balance of 80° F., and as 1095 B. t. u. is the total heat required per lb. of water at 75° F. into vapor at 80° F. at 0.998 lb. absolute, it will require approximately 3 lbs. of steam flowing in pipe 67 to vaporize one pound of water in the space surrounding same, or, 33% of the water used by the jet 42 will be replaced as make-up water through pipe 85, tank trap 80, and pipes 81 and 82.

The 1095 B. t. u. will be transformed into the mechanical equivalent of 778 foot lbs. per B. t. u. for a total of approximately 852,000 foot lbs. per pound of steam, utilized to break the vacuum between chambers, 27 and 23 and deliver the water from 26 into passage 22 against a super-atmospheric pressure of 4 lbs. gauge, more or less, as desired.

The work required to deliver the water of the primary receiver or standpipe 26 under a vacuum of 26 inches (corresponding to an absolute pressure of 3.96 lbs. to the square inch) into the secondary chamber or discharge passage 22 at atmosphere, (plus 4 lbs. gauge super-atmosphere), equals 14.71 lbs. minus 3.96 lbs. plus 4 lbs. equals 14.75 lbs. per square inch; or the approximate equivalent of a column of water of 34 feet altitude at sea level and 39° F. Therefore, the weight of 30,000 gallons of water is, approximately 250,000 lbs., delivered against an equivalent head of 34 feet per minute, equals 8,500,000 foot lbs. of work done; divided by 852,000, the mechanical equivalent of one lb. weight of steam at 80° F., and corresponding pressure, equals approximately, 10 lbs. of steam per minute, or 600 lbs. per hour, to be supplied by the exhaust of the steam turbine 60 at a pressure of 100 lbs. per sq. in.

With a hot well temperature of 77° F., the heat of liquid would be 45 B. t. u. per lb., and if it were raised 100° F. to 177° F. by the steam from jet-air-pump 36, then the heat of liquid would be 145 B. t. u., or a raise of 100 B. t. u. per lb., for a temperature balance between the steam of jet pump 36 and the water of hot well 13 within cooler 30, and the discharge of the jet 36 through pipe 41 would be at a vacuum of 15.7 inches, and with an absolute back pressure in pipe 41 of 7 lbs. per sq. inch and a relative vapor heat content of 1138 B. t. u. per lb. Therefore, one lb. of steam from jet pump 36 would heat, approximately, 11 lbs. of water 100° F. at a balanced temperature of 177° F., in inter-cooler 30, and as there would be approximately 200 times more weight of water than steam passing through cooler 30, it is evident that practically all of the steam from jet pump 36 would be condensed within cooler 30 and both its heat and water returned through the medium of heater 40, back to be regenerated, and the entrained air discharged through pipe 41, to be disposed of by jet-pump 42.

During operation, live steam is discharged through pipe 37 and steam jet air pump 36 drawing air through pipe 38 from surface condenser 12, also from barometric condenser 26 through pipe 88a—88 and by-pass valve 87a, and which would be discharged jointly through pipe 35 into intercooler 30, and therefrom through pipe 46 and valve 45, to the atmosphere primarily, while starting the condenser.

The usual high vacuum for jet type condensers has been assumed as 26″ gauge; that corresponds to an absolute pressure of 3.96 pounds, per square inch; which is created by the air pump 36 and exists throughout the totality of cooling water compartments.

Water would ascend into this vacuum through inlet flume 21, pipe 20, surface condenser 12, pipe 24, to barometric condenser 26; also through outlet flume 22, air chamber 23, Venturi tube 73, to barometric condenser 26; where it would come to rest, at an altitude of 24′ and 9″ above the surface of the cooling water supply, which is assumed (for sake of explanation) to be at sea level.

Live steam would now be admitted through pipe 61 to turbine 60, and exhausting pipe 62 to the jet air pump 65; thereby rotating turbine 60 whose shaft is connected in common with the condensate pump 55 and propellers 52 and 51 at its ends; the water that was at rest will now be set in motion, ascending in pipe 20, and descending in pipe 22, due to this rotation.

Steam being admitted through pipe 63 and jet air pump 65, draws air through suction pipe 43, pipe 88, and from the chamber 27 of the barometric condenser 26, de-aerating the water in same, and discharging the collected air jointly with the steam through pipe 66 into pipe 67 located axially of pipe 68, and having at its terminus an ejector construction 73, comprising the usual component parts, viz., steam tube 67, combining tube 73, and discharge tube 74, which are submerged in the water contained in the condenser 26 which being of the exhaust steam type serves as an eductor type of condenser, for the exhausting steam used by air pump 65 and its discharging stream of water and mingled air collected from compartment 27, constitutes a hydraulic jet of high velocity, along the axis of the Venturi tube 73 which impels and accelerates the moving water in circulation.

The Venturi tube 25, whose internal walls are convexed to a lesser diameter than the diameter of the overflow pipe 24 of the surface condenser 12, extends into the air chamber 23 in such a manner that it is the equivalent of a flow-nozzle; and its object is to govern the rate of flow of water into the air chamber 23 in a ratio, to the rate of flow through pipe 22 for an equal volume of water.

The momentum of the water, due to its velocity through Venturi tube 25, offsets the effect of the vacuum in chamber 27 and the comingled air, or re-aeration from the air pump 65 will be partly liberated in air chamber 23. The object of the air chamber 23 is to provide a liberating space for the air continuously, and of a constant volume, governed by the cubical content of the same; also, a constant maximum air pressure by a relief valve means 91.

The further object of the air chamber 23 is to provide a space, where air that is liberated and slightly compressed by the force of the water discharging through the Venturi tube 25 will act in place of the column of water, that exists from the bottom of the Venturi tube 25 up to the surface of the water in compartment 26, so that the total altitude of the circulating water will act as a waterfall.

In the final operation of starting this method, by-pass valve 87a is now closed, and the chief prime mover started and its exhausting steam condensed in a vacuum of 26" within the wall 13, the water of condensation flowing by gravity from the hot well pump 55, which delivers it through intercooler 30 and heater 40 to the boilers.

The steam exhausting from jet air pump 36 would now be condensed in intercooler 30 and the water of condensation would flow by gravity through pipe 46, trap 47 to hot well pump 55; the object of the trap 47 is to avoid a vicious circulation of air from the intercooler 30 to the well 13 to the jet 36 and then to the intercooler and air only would be discharged through pipe 46 and valve 45, which would now be shifted to discharge through pipe 41 into the suction chamber of jet air pump 42, and the two air pumps would now be working in series.

The back pressure which air pump 36 exhausted against, was one atmosphere 14.71 pounds absolute, until the valve 45 was shifted to air pump 42 whose vacuum is at 26" gauge, and a pressure of 3.96 pounds, per square inch, absolute, and the back pressure of pump 36 is now 10.75 pounds, per square inch, less, due to their operations being in series, and the vacuum in the condenser 12 raised to 29.1" gauge, with a corresponding pressure of 0.875 pounds, per square inch, absolute.

This high vacuum in condenser 12 extends through pipe 81, trap 80, pipe 85, into annular space in pipe 68 and some water within the stand pipe or barometric condenser 26 would rise up in pipe 68 seven feet higher than in the stand pipe 26, for a total altitude of thirty-one feet nine inches above the level of supply water, due to this rise of vacuum in the condenser 12.

As the boiling point of water is at 80° F., when in a vacuum of 29.1" gauge, the condensing point of the steam would also be at 80° F. for the same vacuums; as the boiling point of water and the condensing point of its vapor always agrees, for any given pressures; which, in this case, is 0.875 pounds, per square inch, absolute.

It is understood that the overflow of cooling water would have to be at a temperature slightly below the steam's condensing temperature point for efficient condensation; also, that it would have to be at a temperature point, for economical operation: It is known that the exhausting steam will be 80° F. when at an absolute pressure of 0.875 pounds, per square inch, which is relative to 29.1 inches of vacuum, and if the initial temperature of condensing water is assumed to be at 60° F., then a temperature rise of 15° F. would be available for a final temperature of 75° F., which is 5° F. below the condensing temperature of the exhaust steam of the chief prime mover; theoretically, the temperature of the water of condensation would be the same as the steam, 80° F., if only the latent heat of vaporization was absorbed by the cooling water; but in actual practice, that exact nicety of precision is not obtained, and a slight excess of water is required, which absorbs some of the sensible heat of the water of condensation, which lowers it several degrees to 77° F., and these given temperatures represent the practical limitations for efficient and economical operation of surface condensers at this high vacuum.

The water that ascends the annular space in pipe 68 will be at 75° F., and its boiling point at 80° F.; while the steam and air mixture descending through pipe 67 will be approximately 225° F., a transfer of heat will take place, and some of the water will vaporize; such vapors will flow through pipe 85, trap 80, pipe 81 to condenser 12; such water of condensation, incidental to radiation heat loss by the vapor, would discharge from trap 80, through pipe 82 to hot well 13.

The object of trap 80 is to shunt the collected water past the condensing element and directly to the hot well 13, to avoid further heat loss; and the object for vaporizing water in the annular space in pipe 68 is to provide pure water, that will partly compensate the loss of same by air pump 65.

I claim:

1. The method which comprises maintaining a constant column of water in heat exchange relation with exhaust vapors from a prime mover to form a condensate, maintaining a vacuum on the column of water to retain the column at a constant height, returning the water to its source, increasing the velocity of the returning water, collecting the condensate and forcing said condensate into heat interchange relation with live steam under pressure, utilizing the live steam to create a vacuum on the column of water before said steam has heated the condensate.

2. The method which comprises maintaining a constant column of water in heat exchange relation with exhaust vapors from a prime mover to form a condensate, maintaining a vacuum on the column of water to retain the column at a constant height, returning the water to its source, increasing the velocity of the returning water, collecting the condensate and forcing said condensate into heat interchange relation with live steam under pressure, utilizing the live steam to create a vacuum on the column of water before said steam has heated the condensate utilizing the hydrostatic head of the returning water for aiding in cooperation with a steam turbine to maintain the constant column of water in circulation during heat exchange relation.

3. The method which comprises maintaining a constant column of water in heat exchange relation with exhaust vapors from a prime mover to form a condensate, maintaining a vacuum on the column of water to retain the column at a constant height, returning the water to its source, increasing the velocity of the returning water, collecting the condensate and forcing said condensate into heat interchange relation with live steam under pressure, utilizing the live steam to create a vacuum on the column of water before said steam has heated the condensate utilizing the hydrostatic head of the returning water for aiding in cooperation with a steam turbine to maintain the constant column of water in circulation during heat exchange relation, the steam exhausting from the turbine cooperating with the previously mentioned live steam for maintaining a vacuum on the column of water.

4. The method which comprises elevating a plurality of balanced columns of water from a source by a predetermined vacuum and maintaining the columns of water in heat exchange relation with exhaust steam vapors from a prime mover unbalancing one or more of the columns of water to permit the unbalanced columns to flow by gravity to its source while increasing the speed of flow of said columns, converting the hydrostatic pressure of the falling columns of water into energy for aiding in causing circulation of the rising columns of water.

5. The method which comprises elevating a plurality of balanced columns of water from a source by a predetermined vacuum and maintaining the columns of water in heat exchange relation with exhaust steam vapors from a prime mover unbalancing one or more of the columns of water to permit the unbalanced columns to flow by gravity to its source while increasing the speed of flow of said columns, converting the hydrostatic pressure of the falling columns of water into energy for aiding in causing circulation of the rising columns of water utilizing a portion of the energy of steam at high pressure for aiding in maintaining circulation of the rising columns of water, and utilizing the remaining energy of the high pressure steam for breaking the vacuum on certain of the columns of water to cause the unbalancing of said columns.

6. The method which comprises elevating a plurality of balanced columns of water from a source by a predetermined vacuum and maintaining the columns of water in heat exchange relation with exhaust steam vapors from a prime mover unbalancing one or more of the columns of water to permit the unbalanced columns to flow by gravity to its source while increasing the speed of flow of said columns, converting the hydrostatic pressure of the falling columns of water into energy for aiding in causing circulation of the rising columns of water creating the vacuum on the columns of water by live steam under pressure.

7. The method which comprises elevating a plurality of balanced columns of water from a source of a predetermined vacuum and maintaining the columns of water in heat exchange relation with exhaust steam vapors from a prime mover unbalancing one or more of the columns of water to permit the unbalanced columns to flow by gravity to its source while increasing the speed of flow of said columns, converting the hydrostatic pressure of the falling columns of water into energy for aiding in causing circulation of the rising columns of water creating the vacuum on the columns of water by live steam under pressure collecting the condensate from the exhaust steam vapors of the prime mover and placing said condensate in heat exchange relation with the last mentioned live steam after the steam has expended part of its energy in raising the columns of water.

8. A device of the character described comprising a surface condenser, an inlet conduit and a discharge conduit connected between the condenser and a body of water, Venturi effect in the discharge conduit, means for creating a vacuum in the condenser for aiding in raising columns of water in the discharge and inlet conduits, means for causing circulation of the water in the inlet conduit, means for breaking the vacuum in the discharge conduit, means in the discharge conduit and acted on by the water falling in said conduit for aiding in operating the circulating means in the inlet conduit and means cooperating with the operating means in the exhaust conduit for aiding in actuating the circulating means.

9. A device of the character described comprising a surface condenser, an inlet conduit and a discharge conduit connected between the condenser and a body of water, Venturi effect in the discharge conduit, means for creating a vacuum in the condenser for aiding in raising columns of water in the discharge and inlet conduits, means for causing circulation of the water in the inlet conduit, means for breaking the vacuum in the discharge conduit, means in the discharge conduit and acted on by the water falling in said conduit for aiding in operating and circulating means in the inlet conduit and means cooperating with the operating means in the exhaust conduit for aiding in actuating the circulating means, the means for breaking the vacuum being operatively connected with the cooperation which aids in actuating the circulating means.

10. A device of the character described comprising a surface condenser, an inlet conduit and a discharge conduit connected between the condenser and a body of water, a Venturi effect in the discharge conduit, means for creating a vacuum in the condenser for aiding in raising columns of water in the discharge and inlet conduits, means for causing circulation of the water in the inlet conduit, means for breaking the vacuum in the discharge conduit, means in the discharge conduit and acted on by the water falling in said conduit for aiding in operating the circulating means in the inlet conduit and means cooperating with the operating means in the exhaust conduit for aiding in actuating the circulating means, an intercooler, said vacuum creating means being connected with a source of steam under pressure which is exhausted into the intercooler.

11. A device of the character described comprising a surface condenser, an inlet conduit and a discharge conduit connected between the condenser and a body of water, a Venturi effect in the discharge conduit, means for creating a vacuum in the condenser for aiding in raising columns of water in the discharge and inlet conduits, means for causing circulation of the water in the inlet conduit, means for breaking the vacuum in the discharge conduit, means in the discharge conduit and acted on by the water falling in said conduit for aiding in operating the circulating means in the inlet conduit and means cooperating with the operating means in the exhaust conduit for aiding in actuating the circulating means, an intercooler, said vacuum creating means being connected with a source of steam under pressure which is exhausted into the intercooler, a storage well to collect the condensate from the condenser, and a pump driven by the cooperative means for actuating the circulating means for forcing the condensate into heat interchange relation with the steam exhausting into the intercooler.

12. A device of the character described comprising a surface condenser, an inlet conduit and a discharge conduit connected between the condenser and a body of water, means for maintaining a vacuum in the condenser for retaining a column of water in the conduits at a constant height, means for breaking the vacuum in the discharge conduit to permit the water in the discharge conduit to return to its source while maintaining a constant flow of water through the inlet conduit, the condenser and through the discharge conduit, means interpolated in the discharge conduit for increasing the velocity of the return water, a source of live steam under pressure, means for collecting condensate from the condenser and forcing said condensate into heat-interchange relation with live steam under pressure, and means for causing the steam to create vacuum on the column of water in the intake conduit before said steam has heated the condensate.

13. A device of the character described comprising a surface condenser, a prime mover in communication with the condenser so that exhaust vapors from the prime mover will enter the condenser, an intake conduit connected with the condenser, means for maintaining a vacuum in the condenser for raising a column of water from its source in the intake conduit and for retaining the column at a constant height, a discharge conduit connected with the condenser, means for increasing the velocity of the water in the discharge conduit, means for collecting the condensate from the condenser, a heat exchanger connected with the last-mentioned means and with a source of live steam under pressure, means for forcing the condensate into heat interchange relation with the live steam under pressure in the heat exchanger, means operated by the live steam to create a vacuum on the column of water on the intake conduit before said steam has heated the condensate, a steam turbine, means in the intake conduit and actuated by the steam turbine for maintaining the constant column of water in the intake conduit in circulation during the heat exchange relation, and means acted on by the hydrostatic head of the water in the discharge conduit for aiding in operating the steam turbine.

ALFRED R. EARL.